Sept. 4, 1951      J. C. WORST      2,566,914

SINGLE BOWL COFFEE MAKER WITH SPRING-BIASED COFFEE BASKET

Filed Oct. 18, 1950

Inventor:
Joseph C. Worst,
by *His Attorney.*

Patented Sept. 4, 1951

2,566,914

UNITED STATES PATENT OFFICE 2,566,914

SINGLE BOWL COFFEE MAKER WITH SPRING-BIASED COFFEE BASKET

Joseph C. Worst, Trenton, N. J., assignor to General Electric Company, a corporation of New York Application October 18, 1950, Serial No. 190,682

1 Claim. (Cl. 99—282)

My invention relates to coffee makers and, more particularly, to single bowl coffee makers with spring-biased coffee baskets.

In the present glass coffee maker having two bowls, the bowls are conventionally connected by a glass tube secured to the upper bowl. The tube and the bowls themselves are frequently broken while being cleaned or while being assembled for use. When the coffee maker is cleaned, there is often some difficulty encountered in removing all the used coffee grounds, since some stick to the inside of the upper bowl.

Therefore, an important object of my invention is to provide an improved automatic coffee maker.

Another object of my invention is to provide a relatively inexpensive automatic coffee maker for brewing coffee of a predetermined quality.

Yet another object of my invention is to provide a coffee maker in which the hazards of breakage are reduced.

In carrying out my invention in one embodiment thereof, a spring-biased coffee basket with a thermostatically operated release is held submerged in water. The water is heated by an electrically controlled heater with a magnetic switch. After the water is heated to a predetermined temperature, the basket is released and raised out of the water by its spring. As the basket is raised, the magnetic switch is released, thereby de-energizing the heater.

Figure 1:
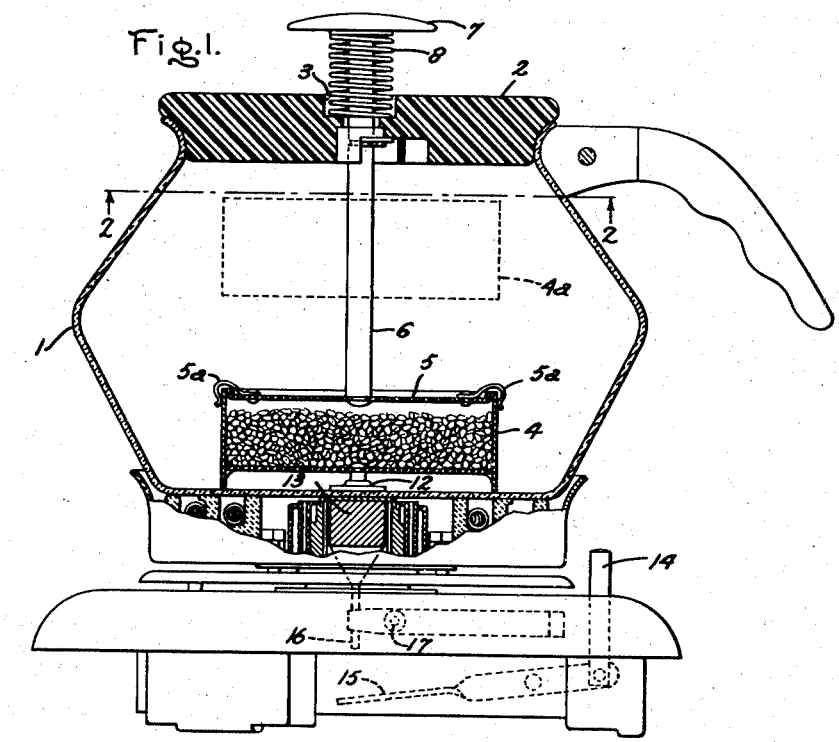
Figure 2:
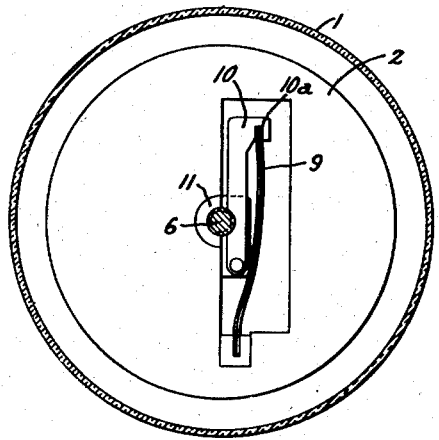
Figure 3:
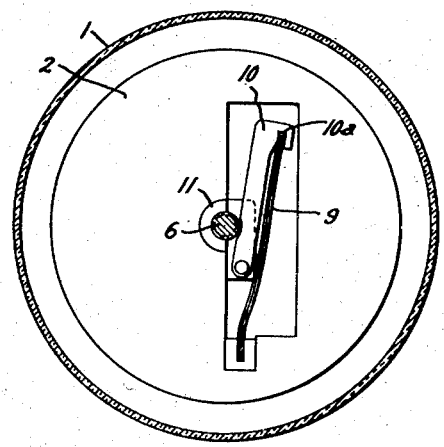

For additional objects and advantages and for a better understanding of this invention, attention is now directed to the following description and to the accompanying drawing and also to the appended claim in which the features of the invention believed to be novel are particularly pointed out. Fig. 1 is a side view, in partial section, of a coffee maker embodying my invention; Fig. 2 is a section taken along line 2—2 of Fig. 1 showing the thermostatically operated release in the closed positions; and Fig. 3 is a section taken along line 2—2 of Fig. 1 showing the thermostatically operated release in the open position.

Referring to the drawing, the bowl 1 is provided with a cover 2 having an aperture 3 therethrough. A receptacle, such as the coffee basket 4, is provided for holding the coffee grounds. The cover 5 for basket 4 is secured to the rod 6 and is provided with means, such as the snaps 5a, for attaching to basket 4. Cover 5 and the bottom of basket 4 are foraminated to permit the passage of water therethrough. The sides of basket 4 are extended below the bottom thereof, and basket 4 rests on this extended portion when it is in the lowered position shown in Fig. 1.

Rod 6 extends upward through aperture 3 and is provided with a knob 7 on the upper end thereof. A bias spring, such as the spring 8, is disposed in compression between cover 2 and knob 7.

The thermostatically operated release comprises the bimetal 9, a latch 10, a collar 11, and a circumferential groove on rod 6 adjacent latch 10 when basket 4 is in its lowered position. Collar 11 is interposed in aperture 3 between cover 2 and rod 6. One end of bimetal 9 is secured to cover 2, and one end of latch 10 is pivotally mounted to collar 11. Latch 10 is provided with a recess in the edge thereof adjacent the aforementioned groove in rod 6. The free ends of latch 10 and bimetal 9 are engaged with one another by means of the recess 10a in the free end of latch 10.

The thermostatically operated release is normally in the position shown in Fig. 2. Upon the attainment of a predetermined temperature level, bimetal 9 straightens and pulls latch 10 out of engagement with rod 6.

The stove and the magnetic switch mechanism for controlling the stove are not described herein, since they form subject matter invented by W. R. Weeks and claimed in his United States Letters Patent 2,287,583, assigned to the same assignee as the present invention. Briefly, this stove and magnetic switch mechanism comprise a magnet keeper 12 secured to the bottom of basket 4, a magnet 13, a push button 14, a lever 15, a plunger 16, and the contacts 17.

The magnet keeper 12 and the permanent magnet 13 coordinate the operation of the switch mechanism controlling the stove with the thermostatically operated release, as hereinafter described.

Before and after a coffee making operation, basket 4 is in the raised position shown by the dotted lines 4a in Fig. 1. Cover 2 and basket 4 are removed to prepare the coffee maker for operation. Bowl 1 is filled with sufficient water and basket 4 is filled with sufficient coffee grounds to make the desired number of cups of coffee. A coarse grind of coffee is preferably used, since the particles are large and are not easily forced through the holes in basket 4. Basket 4 is snapped onto cover 5 and cover 2 is placed on bowl 1. Knob 7 is depressed, compressing spring 8, until basket 4 rests on the bottom of bowl 1. At this time, magnet keeper 12 also rests on the bottom of bowl 1, and latch 10 engages the groove in rod 6, thereby holding basket 4 in the lowered position.

Button 14 is depressed, causing lever 15 to raise the plunger 16 and magnet 13 to the positions shown. When plunger 16 is raised, the contacts 17 are closed, thereby energizing the stove. Permanent magnet 13 is held in the raised position by magnet keeper 12, thereby holding the stove energized. The water trapped under basket 4 is heated and passes up through the coffee grounds. This heated water is replaced by more water seeping under the sides of basket 4. Ordinary manufacturing methods used to form bowl 1 and basket 4 normally result in surface irregularities which permit sufficient water to seep under basket 4 to sustain the percolating operation.

The thermostatically operated release mechanism is adjusted so that rod 6 is released when the temperature level within bowl 1 corresponds to that of a predetermined quality of brewed coffee. When rod 6 is released, spring 8 raises basket 4 to position 4a. As magnet keeper 12 is pulled up, permanent magnet 13 falls and plunger 16 opens contacts 17 to de-energize the stove.

While the present invention has been described by reference to particular embodiments thereof, it will be understood that this is by way of illustration of the principles involved and that those skilled in the art may make many modifications in the arrangement and mode of operation. Therefore I contemplate by the appended claim to cover any such modifications as fall within the true spirit and scope of this invention.

What I claim as new and desire to secure by Letters Patent of the United States is:

In a coffee maker having a single bowl, a cover on said bowl having an aperture therethrough, a rod extending downward through said aperture into said bowl having a knob portion secured to the upper end thereof and having a circumferential recess therearound adjacent said cover, a collar device interposed in said aperture between said rod and said cover, a latch for engaging said rod in said recess having one end thereof pivotally mounted to said collar device and having a slot in the other end thereof, a bimetallic temperature responsive member having one end secured to said cover and having the other end thereof engaged with said latch in said slot in the end thereof for pulling said latch out of engagement with said rod in response to the attainment of a predetermined temperature level within said bowl, a spring disposed in compression between said cover and said knob portion for raising said rod in response to the release of said rod from said latch, a foraminated disk secured to the lower end of said rod in a plane perpendicular to the axis of said rod, a coffee receiving basket having the bottom thereof foraminated and having the sides thereof extending a determinable distance below the bottom thereof for channeling heated water through the foraminated portion thereof, said bowl and said basket having irregularities in the surface thereof for permitting water seepage therebetween, snap means for securing said basket to said foraminated disk so that said disk covers the top of said basket, electric heating means for supplying heat to said bowl, and means controlling said heating means operable responsively to the temperature level within said bowl.

JOSEPH C. WORST.

REFERENCES CITED

The following references are of record in the file of this patent:

UNITED STATES PATENTS

| Number | Name | Date |
|---|---|---|
| 133,681 | Tarlton | Dec. 3, 1872 |
| 285,972 | Cochran | Oct. 2, 1883 |
| 1,623,093 | Chapin et al. | Apr. 5, 1927 |
| 1,921,036 | Mathews | Aug. 8, 1933 |
| 2,234,741 | Schurig | Mar. 11, 1941 |

FOREIGN PATENTS

| Number | Country | Date |
|---|---|---|
| 12,145 | Germany | Jan. 12, 1881 |
| 15,877 | Great Britain | 1901 |